Dec. 15, 1925.

N. E. WOODS 1,565,976

PORTABLE MOTOR

Filed Sept. 21, 1923

INVENTOR:
Norman E. Woods,
BY C.C. Hines,
ATTORNEY.

Dec. 15, 1925.  
N. E. WOODS  
PORTABLE MOTOR  
Filed Sept. 21, 1923  
1,565,976  
9 Sheets-Sheet 4

INVENTOR:  
*Norman E. Woods,*  
BY *C. C. Hines,*  
ATTORNEY.

Dec. 15, 1925.  1,565,976
N. E. WOODS
PORTABLE MOTOR
Filed Sept. 21, 1923   9 Sheets-Sheet 6

INVENTOR:
Norman E. Woods,
BY
C. C. Hines, ATTORNEY.

Dec. 15, 1925.

N. E. WOODS 1,565,976

PORTABLE MOTOR

Filed Sept. 21, 1923

INVENTOR:
Norman E. Woods,
BY
ATTORNEY.

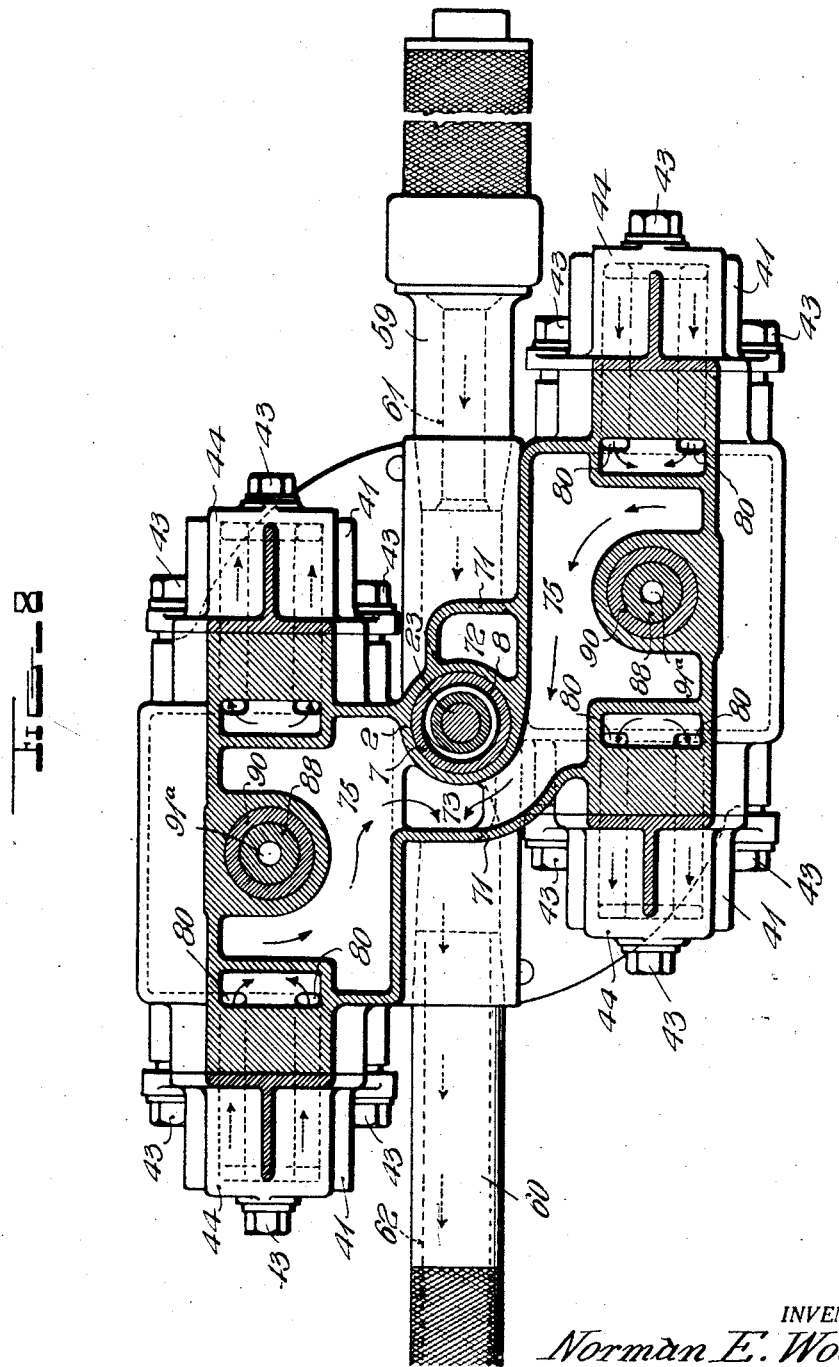

Dec. 15, 1925.
N. E. WOODS
PORTABLE MOTOR
Filed Sept. 21, 1923
1,565,976
9 Sheets-Sheet 9
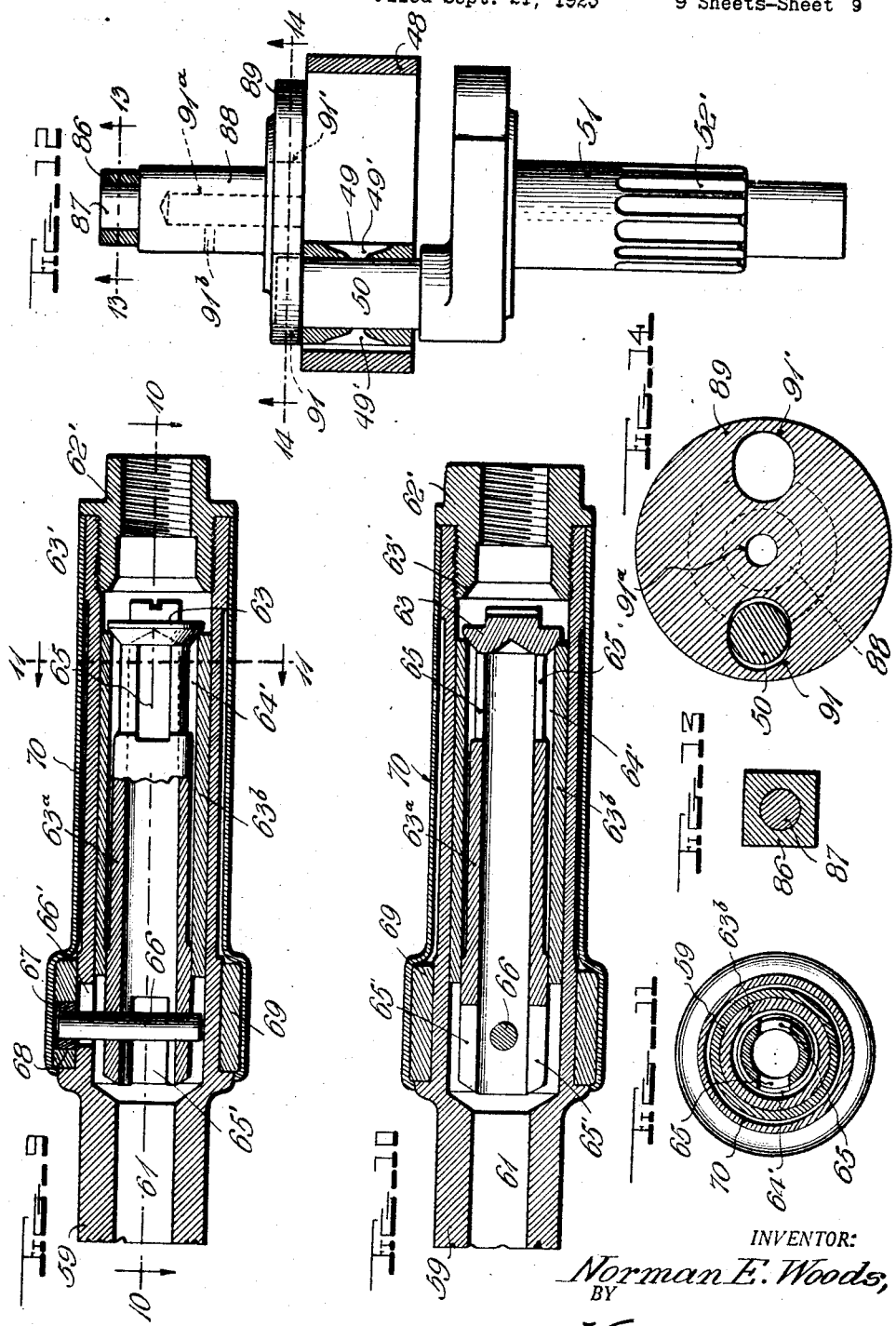
INVENTOR:
Norman E. Woods,
BY
C. C. Hines,
ATTORNEY.

Patented Dec. 15, 1925.

1,565,976

UNITED STATES PATENT OFFICE.

NORMAN E. WOODS, OF PATERSON, NEW JERSEY; LEILA P. WOODS, ADMINISTRATRIX OF SAID NORMAN E. WOODS, DECEASED.

PORTABLE MOTOR.

Application filed September 21, 1923. Serial No. 664,122.

*To all whom it may concern:*

Be it known that NORMAN E. WOODS, a citizen of the United States, and resident of Paterson, county of Passaic, State of New Jersey, did invent new and useful Improvements in Portable Motors, of which the following is a specification.

This invention relates to portable motors of the type driven by compressed air or other motive fluid and employing reciprocating pistons and associated motion translating and transmitting means for communicating driving motion from the reciprocating pistons to a rotary spindle or shaft.

A motor which embodies my present invention is illustrated as applied to a portable drilling-machine, usually termed an "air-drill", of the "piston-drill" type, for imparting rotary motion to the drill or boring-tool from the reciprocations of the pistons. The invention, however, is not limited to the use of air as a motive fluid, as steam or any suitable motive fluid, other than air, may be employed; nor to the specific purpose of driving a drill or boring-tool, as the motor is applicable to all purposes where rotary motion is to be produced from the action of a motive fluid, and transmitted from a rotary spindle or shaft to the tool, machine, or device to be driven.

One object of the invention is to provide a motor having as few working or wearing parts as possible, and which may be maintained in efficient service, at a low cost for replacement or repairs.

Another object of the invention is to provide a motor in which the parts are so combined and disposed as to be readily and conveniently assembled for use or disassembled for cleaning, repairs, replacements or other purposes.

Another object of the invention is to provide a motor in which the pistons and coacting working parts are so constructed and disposed as to transmit maximum power, and a smooth and uniform working motion, to a rotary spindle or shaft.

Another object of the invention is to provide separate oil and grease chambers for each working or moving part or set of parts, so that such parts will be reliably lubricated, regardless of the working position the motor may be in at any time.

Another object of the invention is to provide a motor in which the exhaust motive fluid will be conveyed to the atmosphere, through the dead handle, in a direction away from the operator, eliminating the disadvantages, in this respect, at the present time, of motors of this kind.

Another object of the invention is to provide a novel construction and disposition of motor cylinders, pistons, crank shafts, and crank shaft driving connections between the pistons and shafts, whereby the use of pivotal connections, causing lost motion, undue friction, wear and tear, etc., on the working parts will be avoided.

Another object of the invention is to generally simplify and improve the construction of the motor throughout, so as to reduce cost of construction, maintenance, and repairs; to reduce losses due to leakage of motive fluid or lost motion of working parts; to secure greater smoothness and easier working motion of the parts and the application of greater power to the shaft or spindle; to obviate all liability of dead centers and undue friction, wear, and tear, upon the working parts; and to otherwise eliminate or reduce prior objections to, and increase the efficiency of, motors of this type.

In the subjoined detailed description of the figures of the drawings and construction of the motor, reference is made to the position of the motor, and relative disposition of the parts thereof, in accordance with the showing of the drawings hereto appended, in which the motor is illustrated as being in vertical position, with the tool spindle applied at the bottom, and the feed sleeve handle at the top thereof, which is one of the positions in which the motor may be disposed for service operation.

In the accompanying drawings, showing one operative embodiment of the invention,—

Figure 2:
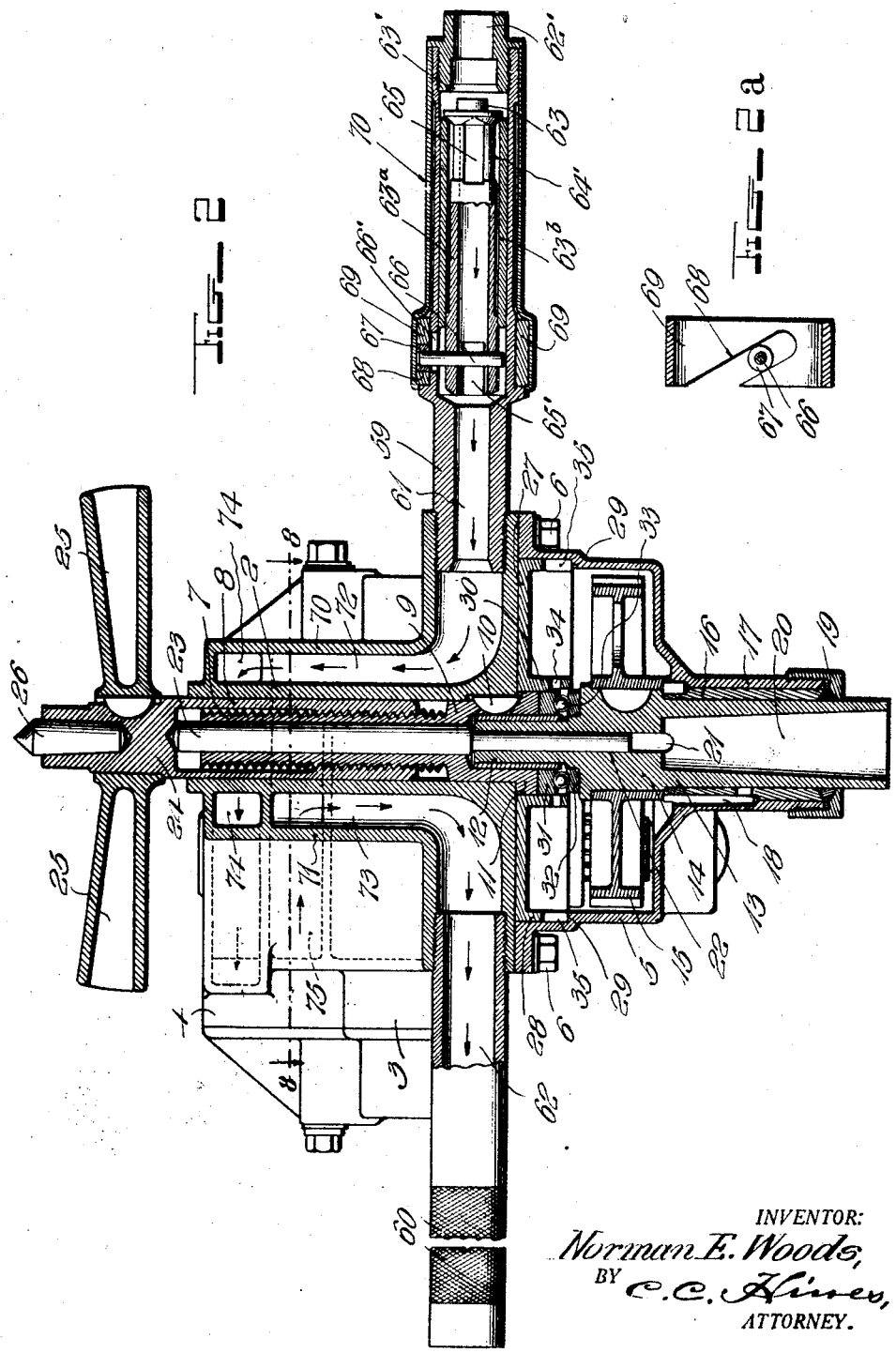
Figure 2 is a central longitudinal section on line 2—2 of Figure 4.

Figure 2ª is an enlarged detail view of parts of the cam mechanism for controlling the throttle valve.

Figure 3:
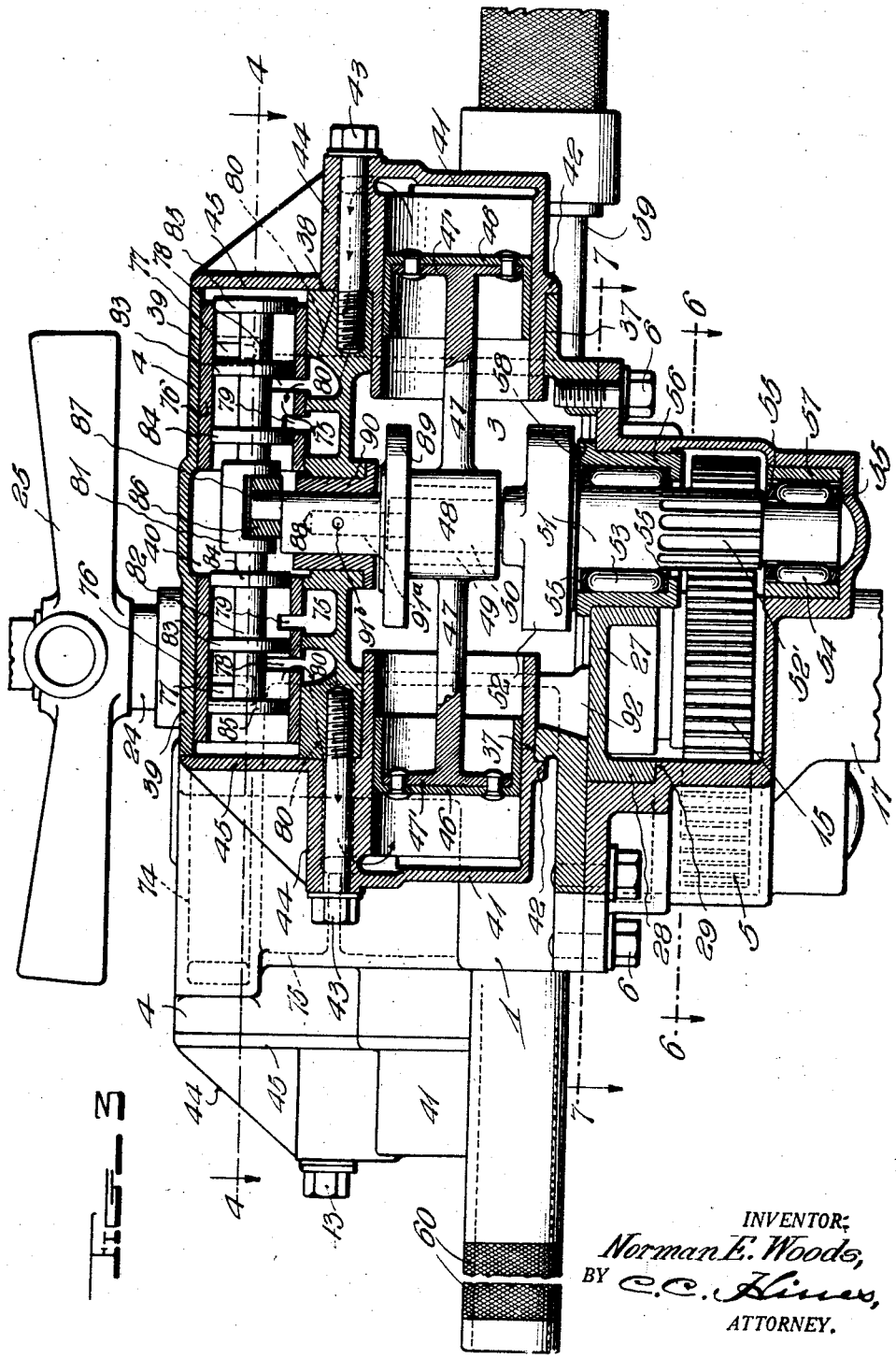
Figure 4:
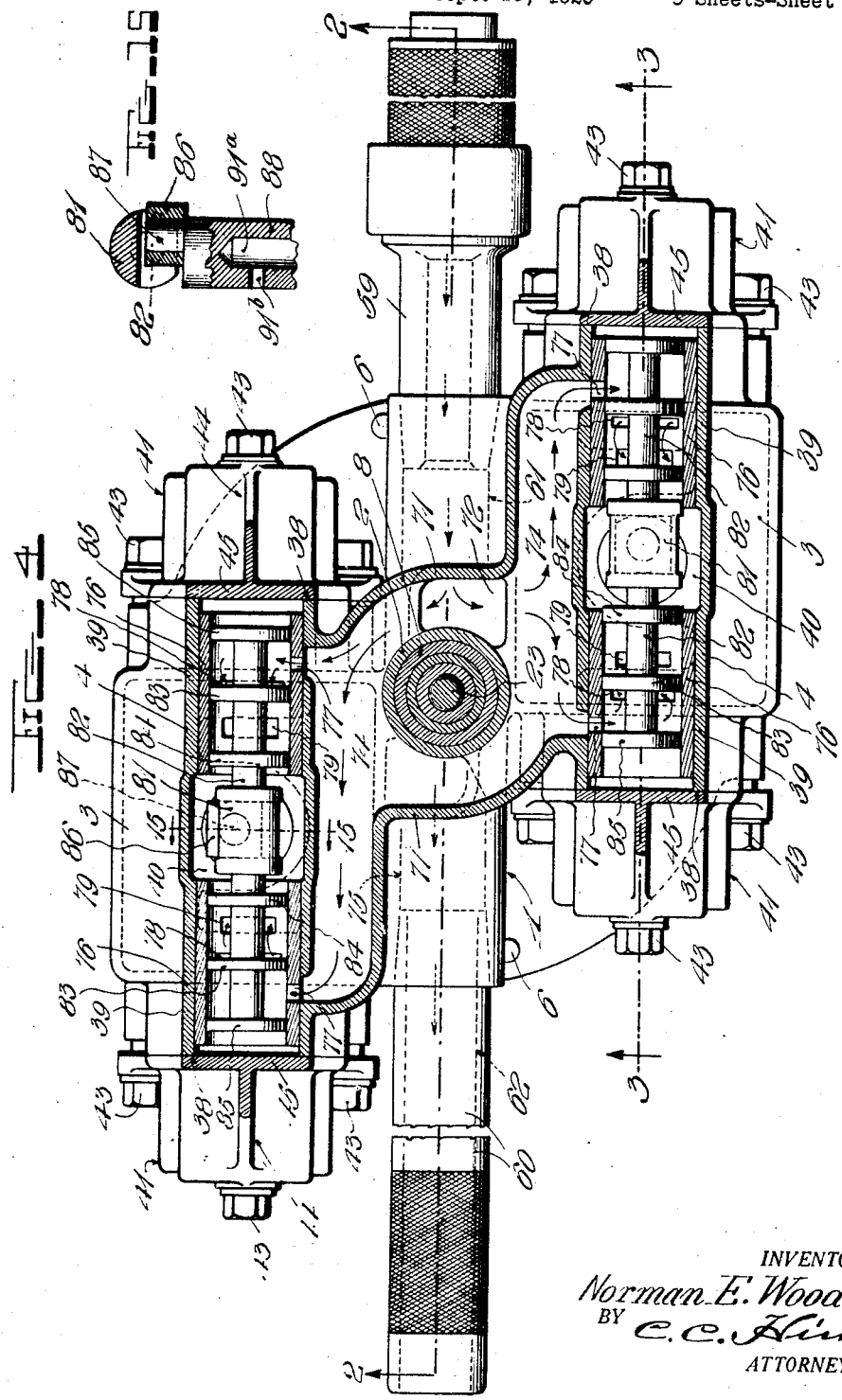

Figure 3 is a vertical longitudinal section on line 3—3 of Figure 4.

Figure 4 is a horizontal section on line 4—4 of Figure 3.

Figure 1:
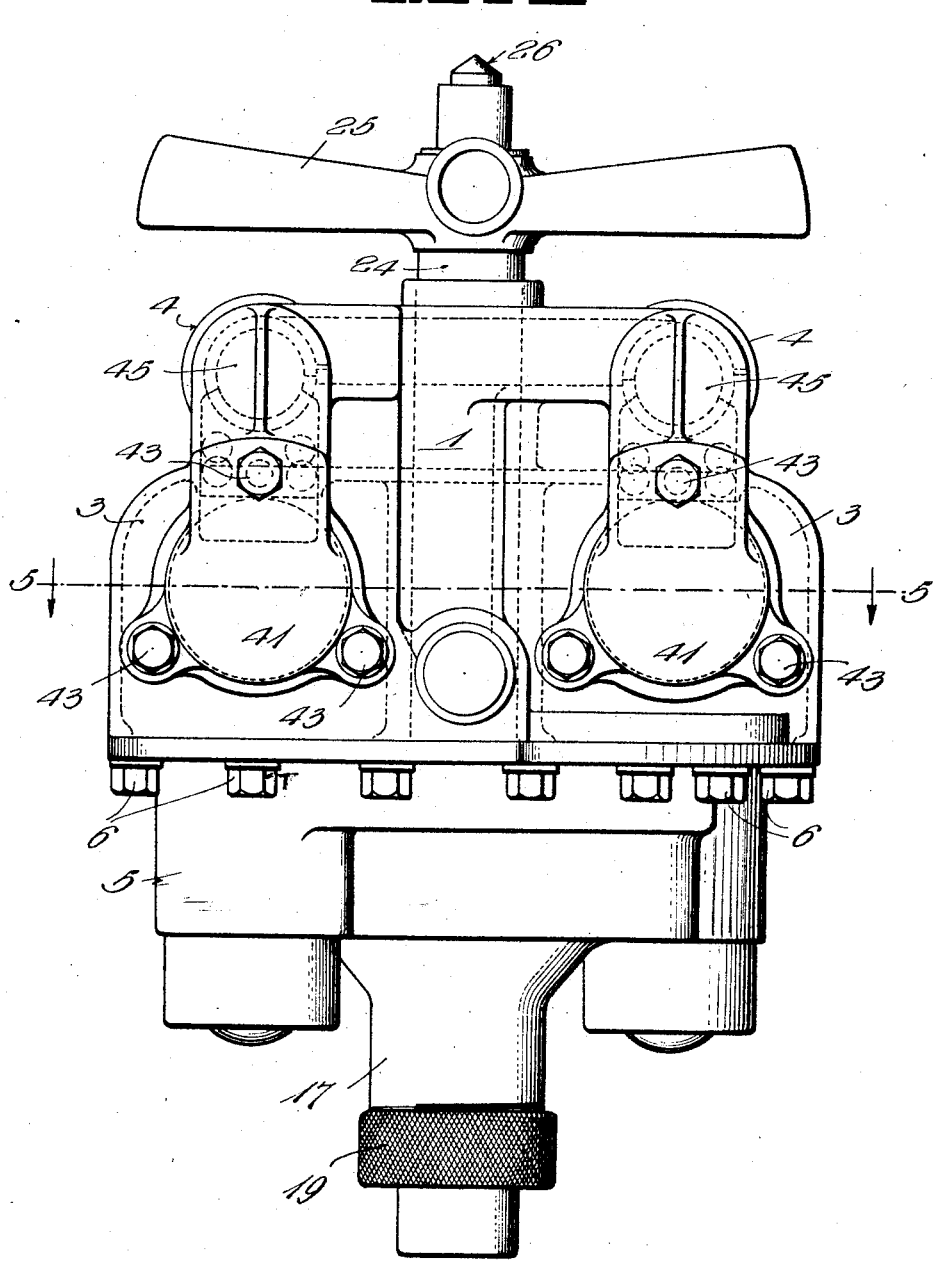
Figure 1 is a side elevation of the motor.
Figure 5:
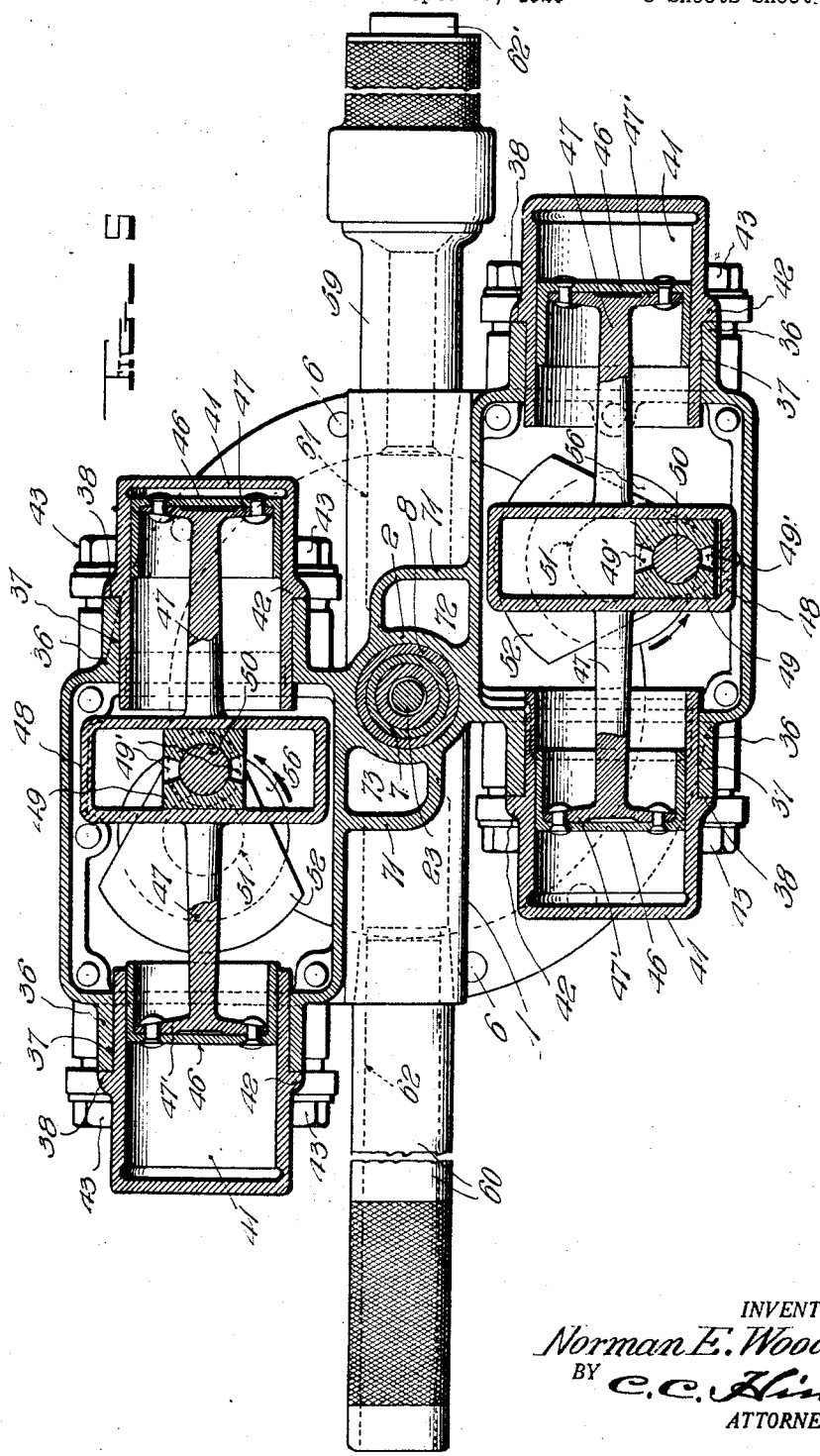

Figure 5 is a horizontal section on line 5—5 of Figure 1.

Figure 6:
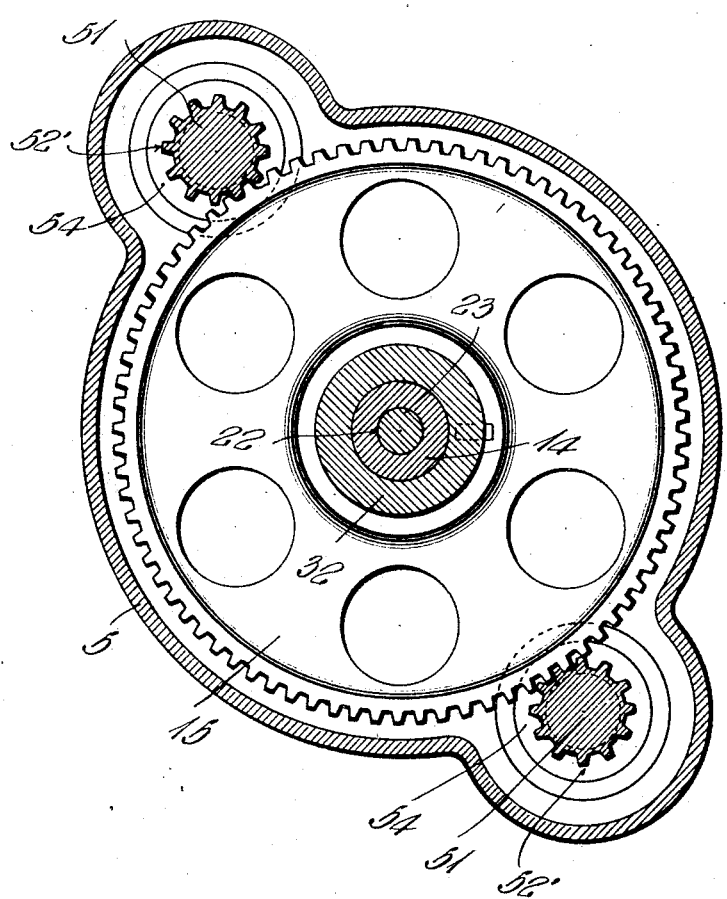

Figure 6 is a horizontal section on line 6—6 of Figure 3.

Figure 7:
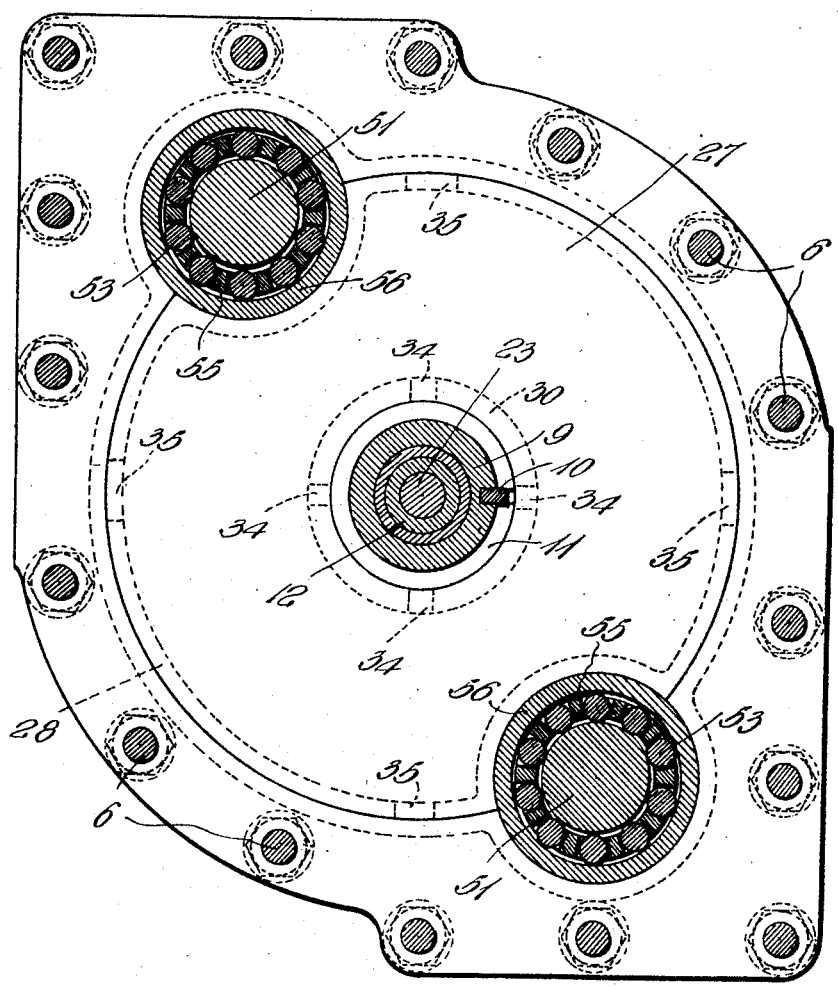

Figure 7 is a horizontal section on line 7—7 of Figure 3.

Figure 8 is a horizontal section on line 8—8 of Figure 2.

Figure 9 is a vertical longitudinal section through the live handle and throttle valve device on an enlarged scale.

Figure 10 is a horizontal transverse section on the line 10—10 of Figure 9.

Figure 11 is a cross-section on the line 11—11 of Figure 9.

Figure 12 is a view in side elevation of one of the transmission shafts and the associated feed and exhaust valve actuating crank, and a vertical cross-section through the associated piston cross-head yoke.

Figure 13 is a detail section on line 13—13 of Figure 12.

Figure 14 is a detail section on line 14—14 of Figure 12.

Figure 15 is a detail section on the line 15—15 of Figure 4.

The motor comprises a main housing or casing, embodying a horizontal body portion 1, from which rises a central column 2, on each side of which are disposed, in superposed relation, a crank and cross-head chamber 3, and a feed and exhaust valve chamber 4, the said housing or casing parts, and certain motive fluid supply and exhaust passages combined therewith, as hereinafter fully described, being preferably formed as a unitary casting. The base portions of the column 2 and chambers 3, open through the bottom of the main housing, and are closed by a removable gear housing or casing 5, the abutting faces of said housings being flanged for passage of bolts or screws 6, whereby the housings are detachably coupled.

The body portion of the column 1 provides an enclosing casing and bearing for the hollow, externally threaded feed post 7, and the hollow internally threaded feed sleeve 8. At its lower end, the feed post 7 is provided with a collar 9, keyed against rotation, as indicated at 10, and having a flange 11, extending under the base of the column. This collar receives the reduced upper end or journal portion 12, of the tool spindle or shaft 13, to the head portion 14, of which, is keyed a large spur gear 15. The spindle 13 is journaled, at its lower end, in a bushing 16, fixed in a bearing portion 17, depending from the gear casing 5, said bushing having ducts 18 for the flow of lubricant to the bearing surfaces, and a stuffing-box 19 being provided, to prevent escape of the lubricant.

In the spindle, there is formed a tool-socket 20, communicating at its upper end with a slot 21, adapted to receive the tang of the tool. The slot 21 is disposed at the lower end of an axial bore 22, extending through the portions 12 and 14, of the spindle, which bore is disposed in alinement with the bore of the feed post 7. An extractor pin 23, is slidably fitted in the bore of post 7, and has a reduced lower end, slidably fitted in bore 22. When the tool is fitted in the socket, the tang of said tool enters the slot 21 and pushes the pin 23 upward. The upper end of pin 23 is adapted to be engaged by the head portion 24, of feed sleeve 8, so that, when it is desired to remove the tool from the socket, the feed screw may be screwed inward until it slides the extractor pin down to its lowest position, as shown in Figure 2, thus forcing the tool out of the socket. The feed sleeve is provided with the usual turning handle 25, and a center-pin or bearing point 26, which may rest against whatever abutment is provided to support or back the device, and form a rigid support for the feed-sleeve during a working operation.

A partition plate 27 is fitted in the top of the gear casing 5, and has a depending peripheral flange 28, which seats against a shoulder 29, on the gear casing, the plate being clamped between said shoulder and the base of the main housing. Said plate also has a depending central circular boss 30, which is located in the space bounded by flange 28, and is of somewhat greater diameter than the bore of column 1. This boss 30 receives the flange 11 of collar 9, and forms an enclosure for an antifriction thrust bearing 33, disposed about the spindle journal 12, and between the flange 11 of the collar 9 and the spindle head 14, said bearing comprising upper and lower raceways 31 and 32, and anti-friction bearing balls or their equivalent 33. By this construction, the spindle head is mounted to freely revolve, and is accurately centered and effectually sustained against endwise or lateral deflection, since the bearing elements are securely supported against end thrust and lateral or sidewise pressures and strains. As shown, the edge of the boss 30 extends below the horizontal plane of the bearing members 33 and encloses the space between the raceways 31 and 32, thus preventing any particles of the bearing members 33 from falling into the gear casing 5, and damaging the gears therein, in the event of the possible breaking or crushing of the bearing members under service pressures or strains. In practice, the gear casing is filled with a suitable lubricant in which the contained gears may run, thus keeping the gears constantly lubricated, and feed openings 34 are formed in the boss 30, for the constant supply of lubricant to the bearing members 33 and their raceways. The partition plate 27 is preferably formed as a casting, and notches or openings 35 are formed in the flange 28, opposite the respective openings 34, for the passage of a drill, in order to adapt the said openings 34 to be conveniently formed after the casting is made. The plate 27, which is removable with the gear casing, when the latter is detached, closes said chamber against the possible entrance of dust, dirt, and other substances from above, and keeps the lubricant confined therein, thus preventing the flow of the lubricant therefrom to other portions of the motor, and ensuring the reliable lubrication of the gears, under all conditions and irrespective of the working position in which the motor is held at any time when in service.

Each crank and cross-head chamber 3 is located above a portion of the gear casing 5, and beneath its cooperating feed and exhaust valve chamber 4, and each chamber 3 is preferably of rectangular form and has its end walls 36, formed with circular openings 37, and squared or plane outer abutment faces 38. The valve chamber 4, above each chamber 3, is of circular cross-section throughout, and preferably of like diameter throughout, except at the center, where it is slightly enlarged, forming opposite similar end valve compartments 39, and an intermediate eccentric head and lubricant containing compartment 40, the outer ends of the compartments 39 lying flush with the abutment faces 38. Opposed cup-shaped cylinders 41, each having a central, annular external shoulder 42, are fitted snugly, at their inner halves, within the openings 37, and detachably secured to the end walls of the chambers 3 by bolts or screws 43. The open inner ends of these cylinders extend slightly into the chamber 3, and their shoulders 42 fit tightly against the abutment faces 38, so as to seal the joints against leakage of the motive fluid. As shown, the screws or bolts 43, pass through bored bolting bosses 44, cast with the cylinders, and from these bosses heads 45, also cast integrally with the cylinders, extend upwardly, and abut against and close the ends of the valve chamber 4, against the access of dust, dirt, or other foreign substances. By this construction, provision is made for easily placing the cylinders in position for use, and removing them for cleaning, repairs, or other purposes, and for closing the ends of the valve chambers in a simple manner, and permitting ready access thereto without the use of a multiplicity of separate parts.

Fitted in each pair of opposed cylinders 41, is a pair of opposed reciprocatory pistons 46, comprising cup-shaped bodies, riveted or otherwise rigidly fastened, to the T-shaped outer ends 47' of rods 47, integral at their inner ends with a cross-head-yoke or guide 48. This yoke extends across the chamber 3, and is of oblong rectangular form, or slotted to provide a guideway of such form for a cross-head slide block 49, movable in said guideway, on a line at right angles to the line of motion of the pistons. The piston rods and cross-head form a single-piece working connection between the pistons and cross-head slide, rigidly uniting said pistons and ensuring their motion in the line of the cylinder axes, and thus transmit the power of the pistons in a direct working line, preventing lost motion, piston slap, undue wear and tear, and other objections incident to the use of ordinary forms of cranks, pivoted connecting rods, toggle levers, or other similar pivoted connections as customarily employed. Furthermore, as the crank shafts are located at the center, between the members of tandem cylinders, the crank pistons will engage the spindle gear at diametrically opposite sides, thus evenly applying the power and reducing strain in the cranks and gear teeth. Each slide block 49 is provided with a bearing opening receiving a wrist-pin 50, on the upper end of a transmission shaft 51, which shaft is also provided with a suitable form of counterbalance 52, to ensure an even and regulated continuity of motion thereof. Lubricant inlet openings 49' are formed in the sides of the block 49, facing the ends of the cross-head yoke, so that, on each reciprocatory motion of the slide, lubricant will be forced through the openings to freely lubricate the engaging surfaces of the block and pin 50.

The shafts 51, driven by the respective sets of tandem pistons, at opposite sides of the center of the motor, extend downwardly from the chambers 3 into the gear casing 5 and are provided with gear pinions 52', meshing with the spindle driving gear 15. Hence, in the operation of the pistons, the rectilinear reciprocatory motions of said pistons will be translated by the cross-heads, and cross-head slides, and the eccentric connections between the same and the transmission shafts, into rotary motion on the part of the shafts, which will transmit such rotary motion through the spur gearing before described to the tool driving spindle or shaft 13. In order to ensure maintenance of the shafts 51 and their pinions 52', in correct working alinement, as well as ease of motion of said shafts, sets of antifriction roller or ball bearings 53 and 54, are provided for each shaft 51 above and below, that is, on each side of, its pinion 52'. These bearings are shown in the present instance as roller bearings, turning in suitable retaining cages or raceways 55, disposed respectively in bearing cups 56 and 57. As shown particularly in Figures 3 and 7, the cups 56 are removable, and are fitted in seats conjointly formed by segmental recesses in opposed marginal portions of the gear casing 5 and partition plate 27, and are clamped between the walls of said recesses, and said cups are provided with flanges 58, which rest upon the upper faces of said marginal portions of the gear casing and partition plate, whereby the cups may be disposed and held at the proper elevation. The cups 57, on the other hand, are preferably formed on the gear casing, and as integral parts of the bottom wall thereof. The bearings 56 will be lubricated by supply of a sufficient quantity of lubricant from chambers 3 and 5, while the bearings 57 will be lubricated from the store of lubricant within the casing 5.

Secured at one side of the main housing, is a tubular live handle 59, and secured at the diametrically opposite side of the main housing, is a tubular dead handle 60. These handles are provided to adapt the device to be supported and manipulated, and further serve as conductors for the admission and exhaust of the compressed air, steam or other motive fluid employed, the bores 61 and 62, respectively, of said handles, providing conduits for the admission and exhaust of the motive fluid. A nipple 62' is provided upon handle 59 for connection with a motive fluid supply hose or pipe, and this nipple is formed with a chamfered or flaring surface 63' to direct the entering fluid fully against the face of a throttle valve 63. Valve 63 is disposed at the outer end of a hollow sliding stem or sleeve 63ª movable in a bushing 63ᵇ, the outer end of which bushing forms a seat 64 against which valve 63 is adapted to close. The outer portion of the stem 63ª, is reduced to provide a passage 64' between it and the bushing 63ᵇ, which is closed by the inner portion of the stem against direct communication with passage 61, and one or more lateral ports 65 are provided in the stem, immediately in rear of the valve, for the inflow of the motive fluid from said passage 64' and into the bore of the stem when the valve is opened. At its inner end the bore of the stem is in open communication with the passage 61 and also provided with one or more lateral ports 65' for the free flow of the motive fluid from the stem to said passage 61. Fixed to the rear end of the valve stem is a pin 66, slidable in a guide slot 66' in handle 59 and carrying a stud 67 movable in an inclined or cam slot 68, in a cam ring 69, rotatably mounted on the handle. A rotary valve actuating sleeve or handle 70, mounted on the handle 59, is fixedly connected with the cam ring 69 and is adapted to be rotated in reverse directions for transmitting motion, through the cam connection described, to shift stem 63ª longitudinally inward and outward and thereby move valve 63 toward or from its seat 64. When valve 63 is opened, fluid pressure may enter through the nipple 62', pass behind the valve and enter the bore of steam 63ª through the passage 64' and ports 65 and thence flow through the open inner end of the stem and ports 65' into the conduit 61 for passage to the motor cylinders. The conduit 62 extends the full length of handle 60 so that the motive fluid, on its final exhaust, will be discharged in a direction away from the operator, thus eliminating the well-known annoyances and objections commonly present in air-drills or motors of this type.

The column 1 includes external walls 71, forming webs rigidly uniting the same with the chambers 3 and 4, and which cooperate with suitable partitions to provide fluid feed and exhaust passages 72 and 73, extending upwardly on opposite sides of the column, communicating, at their lower ends, with the respective conduits 61 and 62, and communicating, at their upper ends, with intake and exhaust manifolds 74 and 75, provided for the common supply of the motive fluid to, and its exhaust from, the respective oppositely disposed sets of piston cylinders and the valves controlling the supply of motive fluid thereto.

Each feed and exhaust valve chamber 3 is disposed above its companion working cylinders and pistons, and is provided, in its compartments, with bushings 76, having feed ports 77, communicating with the intake manifold chamber 74. Each bushing 76 is also provided with a combined intake and exhaust port 78 and an exhaust port 79. The ports 78 are connected by passages 80 with the outer ends of the cylinders, while the ports 79 communicate with the exhaust manifold 75. A reciprocatory valve is provided in each chamber 3, for controlling the ports 77, 78 and 79, and comprises a central yoke 81, and duplicate valve members on opposite sides thereof, movable in the respective bushings, each of said valve members consisting of a stem 82 carrying a series of three spaced disks 83, 84 and 85. The yoke 81 is transversely slotted or recessed on its underside, to receive a rectangular cross-head 86, fitted upon a crank or wrist-pin 87, carried by a stem 88 extending from head 89. Stem 88 is fitted to turn in a bearing bushing 90, tightly fitted in the bottom wall of the chamber 4, and the head 89, is disposed between this bushing and the underlying associated cross-head yoke 48, and acts incidentally as a weight resting on the yoke to hold said yoke from tilting on the associated shaft 51. The head 89 is provided on one side of its center with an oblong opening 91 to receive the upper end of the crank or wrist-pin 50, which is fitted to turn therein, and on the diametrically opposite side of its center the head 89 is preferably formed with a similar opening 91' to properly distribute its weight and balance it with relation to the crank pin and counterbalance 52. A passage 91ª formed in the stem 89 and leading down to the pin 50 and engaging surfaces of parts 48 and 89, intersects a lateral port 91ᵇ, leading from the bearing opening of bushing 90, whereby a sufficient supply of lubricant may pass to the bearing surfaces of the parts mentioned to keep them efficiently lubricated. It will thus be understood that in the rotary motion of each shaft 51 the feed valve associated therewith will be reciprocated back and forth in its chamber 4, for alternately controlling the supply and exhaust of motive fluid to and from the respective associated cylinders.

Figures 3 and 4 show the valve device at one side of the motor, namely, the particular valve device illustrated at the bottom of Figure 4, shifted fully in the direction toward the live handle 59, or to the limit toward the outer end of its chamber, in which position the valve member at the left hand end of said valve closes communication between the exhaust port 79 and the intake port 77 at that end of the valve chamber and opens communication between the ports 77 and 78 for the flow of the motive fluid through port 77 between valve heads 82 and 85, and thence through port 78 and passages 80 to the underlying left hand cylinder, to impel the same on its working stroke, while the right hand valve member of said valve device is shown as arranged to close communication between the ports 77 and 79 at such end of the valve chamber, and to open communication between the ports 78 and 79 at such end of the valve chamber, allowing the motive fluid previously supplied to the right hand piston cylinder at that side of the motor to flow back through passages 80 and port 78 between the valve heads 83 and 84 through port 79 into the exhaust manifold 75 and then out through the conduit 61 of dead handle 60. During this working motion of the left hand piston of the pair noted, the eccentric pin 87 is turning somewhat idly during a portion of the motion of its shaft 51, and then, in the motion of the shaft, starts the reversal of the valve to its opposite position, in which it will assume the position substantially shown by the upper valve member in Figure 4 at the opposite side of the engine, which valve member is about to begin its movement for the supply of fluid pressure to the cylinder of the right hand piston at that side of the engine. Such reversal of the valve being completed, it will be understood that the valve member at the right hand end of the valve device will close communication between the associated adjacent ports 77 and 79, and open communication between the associated adjacent ports 77 and 78, thus supplying motive fluid to the cylinder of the right hand piston at that side of the engine, while the left hand valve member of said valve device will close communication between the associated ports 77 and 78 at its end of the valve casing and open communication at such end of the valve casing between the ports 78 and 79, for the exhaust of air previously admitted to the cylinder of the left hand piston at such side of the engine in the first-named working position of the valve. Thus the valve, in its reciprocatory movements, will alternately supply motive fluid to the cylinders at its side of the engine, admitting fluid to the cylinder of one of such pistons while allowing the air from the companion cylinder of the other piston to exhaust to the atmosphere. The disposition of the ports and passages and controlling parts of the two valve devices at opposite sides of the engine, may be such that when one valve device at one side of the engine is admitting fluid pressure to a right hand cylinder and exhausting fluid pressure from a left hand cylinder, the action of the other valve may be reversed with respect to the cylinders at the opposite side of the engine, so that two pistons, one at each side of the engine, will at all times be simultaneously moving on their working strokes, and actuating their shafts 51 to simultaneously apply working power at opposite sides of the spindle drive gear 15. This simultaneous working operation of opposite pistons of each pair, applying power simultaneously to opposite sides of the spindle gear, will result in a uniform application of power at all times to the spindle, whereby maximum driving power will at all times be applied and a smooth and even motion at all times also secured.

It will be observed from the foregoing description, and by reference to the drawings, that the crank-shaft crosshead chamber, gear chamber, and valve chambers, are each designed to contain oil, grease or other lubricant to lubricate the bearing surfaces of the working part or set of parts contained therein, and that said chambers are closed against each other. As a result, the lubricant supplied for service in each chamber will be retained therein and held from flowing from chamber to chamber, and leaving certain chambers dry while flooding others as a result of disposing the tool in different working positions. Provision is thus made to ensure the reliable lubrication of all working parts at all times irrespective of the position in which the motor is held at any time for a working operation.

It will also be seen that the invention provides a double-tandem type of motor, in which the two pairs of cylinders are disposed on opposite sides of, and parallel with, the center line of the motor, i. e., a vertical line, passing centrally and longitudinally through the spindle axis and live and dead handles, in the position of the motor as shown and described. This disposition permits of the use of cross-head and crank connections of the character set forth for translating the rectilinear motion of the pistons into rotary motion transmitted to the transmission or crank shafts, in which action the cross-head blocks reciprocate in planes at right angles to the line of travel of the pistons, whereby the use of and the well-known objections to pivoted connecting rods, toggle levers or other pivotally coupled parts are avoided, a smoother and more uniform motion secured and wear and tear upon the parts reduced. Such construction also obviates the use of parts which are liable to become loose or bind and cause excessive friction or liability of easy breakage of working parts. As a result, also, of the novel construction, disposition, and working operation, of the pistons and motion transmitting connections, the power applied to the spindle gear will be more regular and uniform throughout the cycle of action, with the result that the spindle will be substantially free from irregular or jerky motions. In the particular construction disclosed, the pairs of cylinders and pistons forming the power units on opposite sides of the motor, are also shown as offset to a certain extent laterally in opposite directions beyond a transverse line intersecting the spindle and disposed at right angles to the center line of the motor aforesaid, instead of being placed directly opposite each other, so that the transverse centers of the crank and cross-head chambers come on opposite sides of such line and so that the inner ends of opposite or dissimilar cylinders of the tandem units are substantially in transverse alinement with each other and with the rotary spindle. This transverse offsetting of the cylinders is not essential, as the cylinders may be placed in practice directly opposite each other, but it is of advantage under certain conditions, as it permits the walls forming the passages 72 and 73 to be placed at the sides of the column, for more direct connection with the conduits 61 and 62, and also permits the outer walls of the crank chambers to be placed closer to the spindle, allowing boring or reaming to be done with greater ease and facility in close places.

The construction described provides a one-piece main motor housing and a one-piece gear housing, detachably coupled together, and which, with the removable cylinders and their integral valve casing heads, form a casing or housing structure of great simplicity, strength, and durability. These parts, as well as all other parts of the motor, are adapted to be readily assembled for use, and as readily disassembled for cleaning, repairs, replacements, or other purposes. In taking the motor apart, it is simply necessary to clamp the dead handle in a vise with the socket end of the spindle extending upwardly, whereupon, by removing the bolts 6, the gear casing and its contents, together with the crank shafts, may be removed as a unit, the crank shafts and cross-heads being capable, in this operation, of being slipped out of engagement with the cross-head guides and eccentrics. Upon then unfastening the bolts 43 the cylinders, pistons, and eccentrics may be extracted, also the piston valves, as on removal of the cylinders the valve casing heads will be removed therewith. The parts may be assembled by a reversal of the operations just described.

In order to adapt each piston unit, composed of the pair of pistons and one-piece connecting rods and cross-head guide yoke, to be applied and removed with great ease and facility, special provision is made therefor. To this end, the wall of one of the cylinder receiving openings 37 is cut away at its base, as at 92, to provide a clearance space and to increase the length of the bottom opening of the crank chamber which is normally closed by the partition plate 27. This cut away portion or space 92 allows the piston unit, after the cylinders and all other interfering parts have been removed, to be shifted longitudinally in the cylinder receiving openings, until the outer piston member passes outward beyond its cylinder opening, and the inner piston member reaches a position above the space 92, whereupon the piston unit may be tilted downward at an angle and withdrawn through the open bottom of the crank chamber. By a reversal of this operation, the piston unit may be applied for use in the assemblage of the parts, as will be readily understood.

Having thus fully described my invention, I claim:—

1. In a motor, the combination of a central driven shaft or spindle, four cylinders arranged in pairs disposed on opposite sides of said shaft or spindle, the cylinders of each pair being spaced with relation to each other and the axes of the respective pairs being in parallel relation to each other, pistons operating in the cylinders, the pistons of each pair being coupled for movement in unison in the same direction but free from connection with the other pair, transmission shafts arranged on opposite sides of and parallel with the central shaft or spindle and in gear therewith, each transmission shaft being disposed in alinement with the space between opposed cylinders and extending into said space, and connections in the spaces between the cylinders of the pairs forming a driving couple between each pair of pistons and the associated transmission shaft.

2. In a motor, a housing including a central bearing and provided with two pairs of cylinders disposed in parallel relation on opposite sides of said bearing, the cylinders of each pair being spaced at their inner ends and communicating with a crank chamber therebetween, pistons in said cylinders, a rigid connection between each pair of pistons including a cross-head guide disposed and movable in the associated crank chamber, a driven shaft journaled in the central bearing, transmission shafts disposed on opposite sides of the housing in parallel relation to and in gear with the driven shaft, said transmission shafts being in alinement with the crank casings and having end portions provided with wrist-pins extending thereinto, and cross-head blocks engaging said wrist-pins and the cross-head guides.

3. In a motor, a housing having a crank chamber normally open at its base and provided with cylinder receiving openings at opposite sides thereof, cylinders removably fitted in said openings, pistons operating in said cylinders, a connection between the pistons including a cross-head guide disposed in the crank chamber, a cross-head block reciprocable in said guide, a gear case removably secured to the housing below the open base of the crank chamber, a removable partition closing communication between the gear case and crank chamber, a driven shaft journaled in the gear casing, a transmission shaft journaled in the gear casing and partition and projecting through the latter into the crank case and provided with a wrist-pin removably engaging the cross-head block, and gearing in the gear chamber between the driven and transmission shafts.

4. In a motor, a housing having a crank chamber normally open at its base and provided with cylinder receiving openings at opposite sides thereof, cylinders removably fitted in said openings, pistons operating in said cylinders, a connection between the pistons including a cross-head guide disposed in the crank chamber, a cross-head block reciprocable in said guide, a gear case removably secured to the housing below the open base of the crank chamber, a valve chamber above the crank chamber and communicating through an opening therewith, a bearing bushing in said opening, a valve in said chamber controlling the supply and exhaust of fluid pressure to and from the cylinders, a removable partition closing communication between the gear case and crank chamber, a driven shaft journaled in the gear casing, a transmission shaft journaled in the gear casing and partition and projecting through the latter into the crank case and provided with a wrist-pin removably engaging the cross-head block, gearing in the crank case between the driven and transmission shafts, a stem journaled in the bearing bushing and having a removable cross-head and wrist-pin connection with the valve, and a head carrying said stem and operatively connected with the wrist-pin of the transmission shaft.

5. In a motor, a pair of opposed and alined cylinders, pistons operating therein, a rigid connection between and movable with the pistons and including a cross-head-guide having a guide slot extending in a direction at right angles to the line of motion of the pistons, a crosshead block fitted to reciprocate in the guide slot of the cross-head-guide, a driven shaft, a transmission shaft in gear therewith, a reciprocating valve controlling the supply and exhaust of fluid pressure to and from the cylinders, an oscillatory stem operatively coupled to the valve for transmitting reciprocatory motion thereto, a head loosely bearing on the crosshead-guide at one side thereof and carrying said stem, said head having a wrist-pin receiving opening therein at one side of its center, a fixed head carried by the transmission shaft and bearing against the opposite side of the crosshead-guide, and a wrist-pin carried by the latter-named head loosely engaging and extending through the crosshead block for receiving rotary motion therefrom and loosely engaging said wrist-pin receiving opening in said first-named head for transmitting rotary motion thereto, the said oscillatory stem and the head carrying the same being of unitary construction and the wrist-pin connections between the same and the valve and the fixed head being of slip-type so that said parts may be operatively coupled and uncoupled by relative movements and without application and removal of interconnecting fastenings.

6. In a motor, a housing having a crank chamber normally open at its base and having cylinder receiving openings at its sides a valve casing disposed above the crank chamber and having normally open ends lying in alinement with the outer ends of the walls of said cylinder receiving openings, a detachable bottom closure for the open base of the crank chamber, cup-shaped cylinders removably fitted at their inner halves within the cylinder receiving openings with their outer halves projecting beyond said openings, said cylinders being provided with integral heads closing their outer ends and substantially central shoulders to abut against the outer end walls of the cylinder receiving openings to limit their insertion therein, and said cylinders being further provided with integral head extensions lying inwardly of their closure heads and substantially in the plane of their shoulders and arranged to close the ends of the valve chamber, a valve operating in the valve chamber, a shaft carried by and removable with said bottom closure, pistons operating in the cylinders, a rigid connection between the pistons extending across the crank chamber, and detachable coupling connections between said connection and the valve and shaft for reciprocating said valve and rotating said shaft.

7. In a motor, a housing having a crank chamber normally open at its base and provided with alined cylinder receiving openings at opposite sides thereof, a valve chamber normally open at its ends and extending parallel with the cylinder receiving openings and having its open ends alining with the outer ends of said cylinder receiving openings, a gear case removably secured to the housing below and closing the open base of the crank chamber, a reciprocatory valve in the valve chamber, a shaft journaled in and removable with the gear case and extending at its upper end into the crank chamber, cylinders removably fitted within the cylinder receiving openings and extending at their inner ends into the crank chamber, said cylinders being cup-shaped and closed at their outer ends by integral heads, said heads being provided with integral extensions lying inwardly of the ends of the outer ends of the cylinders and closing the ends of the valve chamber, pistons operating in the cylinders, a rigid connection between the pistons in the crank chamber including a crosshead-guide, a crosshead block reciprocable in said guide, a motion transmitting member coupled to the valve for reciprocating the same, and a wrist-pin connection between the shaft and the crosshead block and said motion transmitting member adapted for coupling engagement and disengagement by movements of the shaft into and out of working position when said removable gear case is applied and removed to close and expose the open base of the crank chamber.

8. In a motor, a housing having two pairs of alined cylinders arranged in parallel relation on opposite sides of its center, and a crank chamber between each pair of cylinders, each crank chamber being normally open at its base, a gear chamber removably mounted at the base of the housing, a driven shaft journaled in said gear chamber and disposed on a line between the pairs of cylinders, pistons operating in the cylinders, a rigid connection between each pair of pistons including a cross-head guide, a cross-head block removable in each cross-head guide, bottom anti-friction bearings in the gear casing, a removable partition plate between the gear chamber and crank chambers and closing the top of the gear chamber and normally open bases of the crank chambers, the walls of the housing and the periphery of said plate having matching recesses forming bearing receiving openings, top anti-friction bearings held in said openings and disposed above said bottom bearings in the gear case, transmission shafts located in line with the crank chambers and having lower ends provided with pinions and journaled in said bottom and top anti-friction bearings respectively above and below the pinions, the upper ends of said shafts extending into the crank chambers and being provided with wrist-pins engaging the cross-head blocks, and a gear in the gear case fixed to the driven shaft and meshing with the transmission shaft pinions.

9. In a motor, a housing having a crank chamber normally open at its base and provided with alined cylinder receiving openings at opposite sides thereof, said housing having a cut-away portion at its base beneath the inner end of one of said cylinder receiving openings, a valve chamber disposed above the crank chamber and normally open at its ends, a reciprocatory valve in said chamber, cup-shaped cylinders removably fitted in the cylinder receiving openings and extending at their inner ends into the crank chamber, said cylinders being provided at their outer ends with integral closing heads and having extension heads lying inwardly of their outer ends and over the cylinders and closing the ends of the valve chamber, pistons operating in said cylinders, a rigid connection between the pistons including a crosshead-guide disposed in the crank chamber, a gear case removably secured to the housing below and closing the open base of the crank chamber, a motion transmitting member disposed in the crank chamber and having a part extending therefrom into the valve chamber and operatively coupled to the valve for transmitting reciprocating motion thereto, a shaft journaled in and removable with the gear case, said shaft having its upper end extending into the crank chamber, a crosshead block reciprocable in the crosshead-guide, and a wrist-pin carried by the shaft and coupled to the crosshead block and motion transmitting member, said wrist-pin being engageable with and disengageable from said crosshead block and motion transmitting member by upward and downward movements of the shaft with the gear case in the operations of applying and removing the latter, and said pistons and their rigid connection being adapted for removal as a unit through the open base of the crank chamber when the gear case and cylinders are removed by longitudinal and angular withdrawal movements thereof permitted by said cut-away portion of the housing.

10. In a motor, a housing having a crank chamber normally open at its base and provided with cylinder receiving openings at opposite sides thereof, a valve chamber having normally open ends alining with the ends of the cylinder receiving openings, removable cup-shaped cylinders having their inner halves fitted within said cylinder receiving openings and their outer halves projecting outwardly beyond said openings, said cylinders having abutment shoulders located substantially midway of their length and engaging the outer ends of the walls of the cylinder receiving openings to limit their extent of insertion, and being provided with integral closure heads at their outer ends, and said cylinders also having extension heads integral therewith and lying substantially in the plane of the shoulders and closing the ends of the valve chamber, a detachable closure for the open base of the crank chamber, a shaft journaled in said closure, pistons operating in the cylinders, and motion transmitting connections, extending into the crank chamber, between the pistons and the shaft and valve for transmitting rotary motion to the shaft and reciprocatory motion to the valve.

11. In a motor, the combination of a housing provided with two pairs of tandem cylinders disposed in parallel planes but with the similar cylinders of the pairs offset from direct transverse alinement so as to bring the inner end of one cylinder of each pair substantially in transverse alinement with the inner end of the dissimilar cylinder of the other pair, pistons in said cylinders, the pistons of each pair of cylinders being coupled for movement in unison, a rotary spindle journaled in the housing between the pairs of parallel cylinders and substantially in line with the substantially alined inner ends of the dissimilar cylinders of the pairs aforesaid, transmission shafts, one for each pair of cylinders, in gear with the spindle, each transmission shaft being located on a line between the inner ends of its cylinders, and motion transmitting connections between each pair of coupled pistons and its associated transmission shaft including a member coupling said pistons and a member movable in a plane at right angles to the first-named member and to the plane of reciprocation of the pistons.

12. In a motor, the combination of a housing provided with two pairs of tandem cylinders disposed in parallel relation, the cylinders of each pair being spaced at their inner ends, a rotary spindle journaled in the housing between the pairs of tandem cylinders, pistons in the cylinders, connecting means between the pistons of each pair comprising rods rigid with the pistons and a cross-head rigid with the rods, said cross-head being disposed in the space between the inner ends of the cylinders and having a guideway extending at right angles to the plane of reciprocation of the pistons, motion transmission shafts, one for each pair of pistons, said shafts being in gear with the spindle, and disposed on opposite sides thereof in alinement with the spaces between the respective cylinders, said shafts having wrist-pins projecting into said spaces, and a cross-head block movable in the guideway of each cross-head and engaging the wrist-pin of the associated transmission shaft.

13. In a motor, the combination of a housing provided with two pairs of tandem cylinders disposed in parallel relation, and a crank and lubricant chamber between the cylinders of each pair, pistons operating in the cylinders, a rotary spindle journaled in the housing between the pairs of cylinders, transmission shafts, one for each pair of pistons, in gear with the spindle, said shafts being arranged on lines between the inner ends of the cylinders and having wrist-pins projecting into the respective crank and lubricant chambers, a connection between the pistons of each pair including a cross-head disposed in the intervening crank and lubricant chamber and having a guideway extending at right angles to the plane of reciprocation of the pistons, and a cross-head block engaging the wrist-pin of each transmission shaft and reciprocable in the associated cross-head.

14. In a motor of the character described, a housing having a crank chamber, cylinder receiving openings at opposite ends of the crank chamber, and a valve chamber having normally open end portions, cylinders removably fitted in said openings, said cylinders being closed at their outer ends by heads having extensions closing the open ends of the valve chamber, pistons in the cylinders, a valve in the valve chamber for governing the flow of fluid pressure to and from the cylinders, a rotary spindle, and a shaft in gear with the spindle and having portions extending into the crank casing and valve chamber and coupled to the pistons and valve for receiving motion from the former and communicating motion to the latter.

15. In a motor of the character described, a housing having a crank chamber normally open at its bottom and cylinder receiving openings at opposite ends of said crank chamber, cylinders removably fitted in said openings, pistons operating in the cylinders, a rotary spindle, a spindle driving crank shaft, a one-piece motion transmitting and coupling connection uniting the pistons and in detachable driving engagement with the shaft, a closure for the bottom opening of the crank chamber in which the shaft is journaled so as to be removable with said closure, the housing being provided with a clearance space intersecting the base of the inner edge of one of the cylinder receiving openings and widening the crank chamber at its base to admit removal of the pistons and one-piece connection as a unit through the bottom opening of the crank chamber upon removal of the cylinders, closure and crank shaft.

16. In a motor of the character described, a housing having crank chambers disposed on opposite sides of its longitudinal center and opening through the base of the housing, and provided with horizontally alined cylinder receiving openings at the opposite ends of each crank chamber, cylinders detachably fitted in the cylinder receiving openings, pistons in said cylinders, rigid connections between each pair of alined pistons including a slotted cross-head yoke, a detachable gear casing closing the bottom openings of the crank chambers, a spindle journaled in said gear casing, a gear in the gear casing, and fixed to said spindle, crank shafts journaled at their lower ends in the gear casing and provided with pinions meshing with said gear and having their upper ends extending into the crank chambers and provided with wrist-pins, and cross-head blocks engaging said wrist-pins and reciprocable in the cross-head, said shafts and crossheads being removable as a unit with the gear casing when the latter is detached and said rigidly coupled pistons and their yokes being removable as units through the bottom openings of the crank chambers when the cylinders and gear casing are detached.

17. In a motor, the combination of a main housing having two crank chambers arranged in parallel planes, said chambers opening through the bottom of the housing, a pair of alined cylinders at opposite ends of each crank chamber, cross-heads in the crank chambers rigidly connected with the pistons of each pair, a gear casing detachably secured to the main housing, a partition plate closing the top of the gear casing and bottom openings of the crank chambers, a rotary spindle journaled in the gear casing on a line between the pairs of cylinders, a gear in said casing and coupled to said spindle, transmission shafts journaled at their lower ends in the gear casing in alinement with the crank chambers and having their upper ends extending through said openings upwardly into the crank chambers and provided with wrist-pins, and cross-head blocks operating in the cross-heads and coupled to the wrist-pins of the transmission shafts.

18. In a motor, a housing having crank chambers and cylinders communicating therewith, valve chambers communicating with the cylinders but closed against communication with the crank chambers, a gear casing closed against communication with the crank chambers, pistons operating in the cylinders, cross-heads coupled to the pistons and disposed in the crank chambers, valves in the valve chambers, a rotary spindle journaled in the gear casing on a line between the pairs of cylinders, a gear in said casing and fixed to said spindle, transmission shafts journaled at their lower ends in the gear casing in alinement with the crank chambers and extending upwardly into the crank chambers and provided with wrist-pins, cross-head blocks engaging such wrist-pins and the cross-heads in the crank chambers, and eccentrics connected with the transmission shafts and extending upwardly into the valve chambers and operatively connected with the valves.

19. In a motor, a housing having a pair of parallel crank chambers each open at its bottom, cylinders at opposite sides of each crank chamber, pistons in said cylinders, a one-piece connection between each pair of pistons including a cross-head guide movable in the interposed crank chamber, a valve chamber disposed above each crank chamber, a valve in said chamber, a gear casing detachably secured to the housing, a partition plate fitted in said casing and closing communication between the same and the bottom openings of the crank chambers, a spindle journaled in the gear casing on a line between the pairs of crank chambers and cylinders, a gear in said casing and fixed to said spindle, transmission shafts journaled in the gear casing and partition plate and provided with pinions meshing with said gear, said shafts being arranged in alinement with the crank chambers and extending upwardly into the crank chambers and being provided with wrist-pins, cross-head blocks engaging said wrist-pins and movable in the cross-heads, and members detachably engaging the wrist-pins and extending upwardly into the valve chambers and operatively connected with the valves.

In testimony whereof I affix my signature.

NORMAN E. WOODS.